US011921455B2

(12) United States Patent
Saito et al.

(10) Patent No.: US 11,921,455 B2
(45) Date of Patent: Mar. 5, 2024

(54) LUBRICANT SOLID, IMAGE FORMING APPARATUS, AND PROCESS CARTRIDGE

(71) Applicant: FUJIFILM Business Innovation Corp., Tokyo (JP)

(72) Inventors: Yohei Saito, Kanagawa (JP); Jiro Korenaga, Kanagawa (JP); Shoko Hachiya, Kanagawa (JP); Ryo Sekiguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/940,496

(22) Filed: Sep. 8, 2022

(65) Prior Publication Data

US 2023/0280689 A1 Sep. 7, 2023

(30) Foreign Application Priority Data

Mar. 2, 2022 (JP) ................................. 2022-031979
Mar. 2, 2022 (JP) ................................. 2022-031980

(51) Int. Cl.
*G03G 15/16* (2006.01)
*G03G 21/00* (2006.01)
*G03G 21/18* (2006.01)

(52) U.S. Cl.
CPC ..... *G03G 21/0094* (2013.01); *G03G 21/0011* (2013.01); *G03G 21/1814* (2013.01); *G03G 2221/183* (2013.01)

(58) Field of Classification Search
CPC ........... G03G 21/0011; G03G 21/0035; G03G 21/0094; G03G 21/1814; C10M 107/02; C10M 107/28; C10M 2221/183
See application file for complete search history.

(56) References Cited

U.S. PATENT DOCUMENTS 5,819,147 A * 10/1998 Shoji ...................... G03G 5/005 399/346
6,177,386 B1 * 1/2001 Aurin ................... C10M 103/02 508/125
8,948,677 B2 2/2015 Kabata et al.
8,995,899 B2 * 3/2015 Hasegawa .......... G03G 21/0094 399/346
2011/0286777 A1 * 11/2011 Sugino ............... G03G 21/0094 399/346

FOREIGN PATENT DOCUMENTS

JP 2007-121908 A 5/2007
JP 2013-015819 A 1/2013
JP 2019-120877 A 7/2019

* cited by examiner

*Primary Examiner* — Hoang X Ngo
(74) *Attorney, Agent, or Firm* — Sughrue Mion, PLLC

(57) ABSTRACT

A lubricant solid contains, in a content of 92 mass % or more and 100 mass % or less, a lubricant having a polygonal network bond structure.

20 Claims, 2 Drawing Sheets

LUBRICANT SOLID, IMAGE FORMING APPARATUS, AND PROCESS CARTRIDGE

CROSS-REFERENCE TO RELATED APPLICATIONS

This application is based on and claims priority under 35 USC 119 from Japanese Patent Application No. 2022-031979 filed Mar. 2, 2022 and Japanese Patent Application No. 2022-031980 filed Mar. 2, 2022.

BACKGROUND

(i) Technical Field

The present disclosure relates to a lubricant solid, an image forming apparatus, and a process cartridge.

(ii) Related Art

Japanese Unexamined Patent Application Publication No. 2019-120877 discloses a solid lubricant that is applied to an image carrier in an electrophotographic image forming apparatus and that is a mixture containing a metallic salt of a fatty acid and silicone resin particles wherein the silicone resin particles have a number-average primary-particle size of 10 nm or more and 250 nm or less.

Japanese Unexamined Patent Application Publication No. 2013-015819 discloses a protective agent block containing metallic soap and boron nitride serving as main components wherein the average of mass ratios of boron nitride to metallic soap determined on the basis of Raman spectra measured at a plurality of points on the protective agent block is 0.050 to 0.330 and the coefficient of variation is 0.075 or less.

The electrophotographic image formation is performed by, for example, charging the surface of an electrophotographic photoreceptor serving as an image carrier, subsequently forming, on the surface of the electrophotographic photoreceptor, an electrostatic image in accordance with image information, subsequently developing the electrostatic image using a developer containing a toner to form a toner image, and transferring the toner image onto the surface of a recording medium and fixing the toner image.

Japanese Unexamined Patent Application Publication No. 2007-121908 discloses an image forming apparatus using an image carrier in which, on the surface of a photosensitive layer for carrying a latent image, a lubricant film is formed wherein the lubricant film is formed of a mixture of a metallic salt of a fatty acid and a lubricating powder material composed of at least one lubricating material selected from melamine cyanurate, polytetrafluoroethylene, molybdenum disulfide, and a fatty acid amide.

SUMMARY

The lubricant solid is used by, for example, using a lubricant supply member to scrape the lubricant contained in the lubricant solid. Specifically, for example, the lubricant supply member is brought into contact with the surface of the lubricant solid and the lubricant scraped with the lubricant supply member is supplied to a lubricant-receiving member.

However, for example, in an electrophotographic image forming apparatus, in the case of supplying, to the surface of an electrophotographic photoreceptor (hereafter, also referred to as "photoreceptor"), a lubricant, the electric load of discharging from, for example, a charging unit that charges the surface of the photoreceptor may cause the supplied lubricant to deteriorate.

Aspects of non-limiting embodiments of the present disclosure relate to providing a lubricant solid that supplies a lubricant that is less likely to deteriorate due to discharging, compared with a case of containing zinc stearate in a content of 8 mass % or more.

In an electrophotographic image forming apparatus using an electrophotographic photoreceptor (hereafter, also referred to as "photoreceptor") as an image carrier, for example, a toner image formed on the surface of the photoreceptor is transferred onto a recording medium and subsequently a cleaning member in contact with the surface of the photoreceptor is used to clean the surface of the photoreceptor. A method of suppressing wear of the surface of the photoreceptor due to the cleaning member may be, for example, a method of disposing a lubricant supply unit that supplies a lubricant contained in a lubricant solid to a point where the cleaning member is in contact with the photoreceptor.

However, when the image forming apparatus in which the lubricant supply unit is disposed employs the intermediate transfer system, wear of the surface of the photoreceptor is suppressed, but transferability of toner images from the intermediate transfer body onto recording media may be degraded. When transferability of toner images is degraded, particularly in images formed on recording media having large surface irregularities such as embossed paper (hereafter, also referred to as "textured paper"), degraded transferability may cause missing color. Thus, there has been a demand for achievement of both of suppression of wear of the surface of the photoreceptor and suppression of missing color due to degradation of transferability.

Aspects of non-limiting embodiments of the present disclosure relate to providing an image forming apparatus including an electrophotographic photoreceptor, a charging unit, an electrostatic-image-forming unit, a development unit, an intermediate transfer body, a first transfer unit, a second transfer unit, and a cleaning unit including a cleaning member in contact with the surface of the electrophotographic photoreceptor wherein, compared with a case of not including a lubricant supply unit or a case of including a lubricant supply unit housing a lubricant solid containing zinc stearate in a content of 8 mass % or more, the image forming apparatus achieves both of suppression of wear of the surface of the electrophotographic photoreceptor and suppression of missing color in images formed on textured paper.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a lubricant solid containing, in a content of 92 mass % or more and 100 mass % or less, a lubricant having a polygonal network bond structure.

BRIEF DESCRIPTION OF THE DRAWINGS

Exemplary embodiments of the present disclosure will be described in detail based on the following figures, wherein.

DETAILED DESCRIPTION

Figure 1:
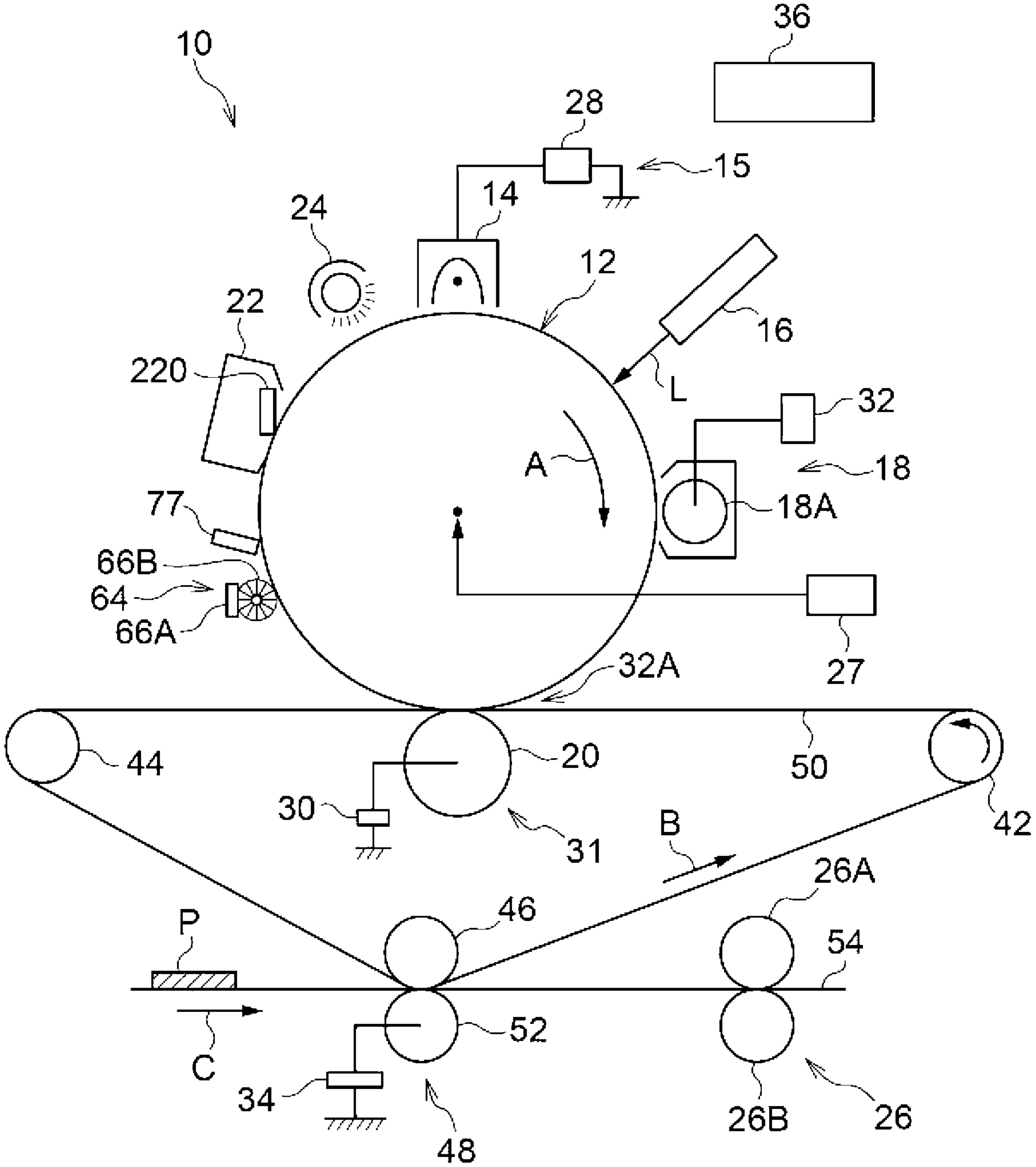
FIG. 1 is a schematic configuration view of an example of an image forming apparatus according to an exemplary embodiment.

Hereinafter, exemplary embodiments according to the present disclosure will be described. Such descriptions and Examples are examples of the exemplary embodiments and do not limit the scope of the exemplary embodiments.

In the present disclosure, in numerical ranges described in series, the upper limit value or lower limit value of one of the numerical ranges may be replaced by the upper limit value or lower limit value of another one of the numerical ranges described in series. In the present disclosure, in numerical ranges described, the upper limit value or lower limit value of such a numerical range may be replaced by a value described in Examples.

In the present disclosure, each of components may include a plurality of substances belonging to the component. In the present disclosure, in the case of referring to the amount of a component in a composition containing a plurality of substances belonging to the component, the amount means the total amount of the plurality of substances present in the composition unless otherwise specified.

Lubricant Solid

A lubricant solid according to an exemplary embodiment contains, in a content of 92 mass % or more and 100 mass % or less, a lubricant having a polygonal network bond structure.

The term "polygonal network bond structure" used herein means a bond structure in which constituent atoms bond together to form a polygonal network structure.

Hereafter, the lubricant having the polygonal network bond structure will also be referred to as "specific lubricant".

As described above, when a lubricant contained in a lubricant solid is supplied to a lubricant-receiving member, for example, the lubricant supply member is brought into contact with the surface of the lubricant solid, the lubricant supply member is used to scrape the lubricant contained in the lubricant solid, and the scraped lubricant is supplied to the lubricant-receiving member.

The lubricant solid is used, for example, in an electrophotographic image forming apparatus using a photoreceptor as an image carrier, for the purpose of, for example, suppressing wear of the surface of the photoreceptor. Specifically, for example, to the surface of the photoreceptor, the lubricant contained in the lubricant solid is supplied to form a cover film of the lubricant, to thereby reduce the frictional force applied by the cleaning member in contact with the surface of the photoreceptor, to suppress wear of the photoreceptor.

On the other hand, when the lubricant contained in the lubricant solid is supplied to the surface of the photoreceptor, for example, the electric load of discharging from, for example, the charging unit that charges the surface of the photoreceptor may cause the lubricant supplied to the surface of the photoreceptor to deteriorate. When the image forming apparatus employs the intermediate transfer system and the lubricant supplied to the surface of the photoreceptor deteriorates, transferability of toner images from the intermediate transfer body to recording media may be degraded. When the transferability is degraded, particularly in images formed on recording media having large surface irregularities such as embossed paper (hereafter, also referred to as "textured paper"), degradation of transferability may result in occurrence of missing color.

The reason why deterioration of the lubricant results in degradation of transferability has not been clarified; however, inferentially, the lubricant having deteriorated is moved to the surface of the intermediate transfer body, to increase the adhesion between the surface of the intermediate transfer body and toner images, and the toner images become less likely to be transferred onto recording media.

By contrast, in this exemplary embodiment, the specific lubricant is contained in a content of 92 mass % or more and 100 mass % or less, so that the lubricant that may be less likely to deteriorate due to discharging may be supplied to the lubricant-receiving member. The reason for this has not been clarified, but is inferred as follows.

For example, in zinc stearate, which is ordinarily used as lubricant, the electric load breaks carbon-carbon bonds in the carbon chain to decompose zinc stearate to break the lamella structure, which inferentially results in deterioration. By contrast, the specific lubricant has the polygonal network bond structure, and hence may be less likely to undergo breaking of bonds even under an electric load due to discharging; even when bonds are partly broken, the network structure may inhibit decomposition, so that the lamella structure may be less likely to be broken inferentially. The lubricant solid contains 92 mass % or more of the specific lubricant and 8 mass % or less of components other than the specific lubricant, so that, even when the components other than the specific lubricant are affected by the electric load, in the lubricant solid as a whole, the lamella structure may be maintained and deterioration may be suppressed. Thus, when the lubricant solid is applied to an intermediate-transfer-system image forming apparatus, degradation of transferability may be suppressed inferentially.

For such reasons, when the lubricant solid contains 92 mass % or more of the specific lubricant, the lubricant that may be less likely to deteriorate due to discharging may be supplied to the lubricant-receiving member inferentially.

Note that, in an intermediate-transfer-system image forming apparatus, when the lubricant supplied to the surface of the photoreceptor is less likely to deteriorate even under the electric load due to discharging, even when the lubricant is moved to the surface of the intermediate transfer body, the increase in the adhesion between the surface of the intermediate transfer body and toner images may be less likely to occur inferentially. Thus, when the lubricant solid according to this exemplary embodiment is applied to an intermediate-transfer-system image forming apparatus, degradation of transferability may be less likely to occur and missing color in images formed on textured paper may be suppressed.

Hereinafter, a lubricant solid 66A according to this exemplary embodiment will be described in detail. Note that the reference sign may be omitted.

Component Contained in Lubricant Solid

The lubricant solid according to this exemplary embodiment contains a lubricant having a polygonal network bond structure (namely, the specific lubricant) in a content of 92 mass % or more and 100 mass % or less.

The specific lubricant is not particularly limited as long as it is a lubricant having a polygonal network bond structure. Note that the polygonal network bond structure may be a planar polygonal network bond structure.

The specific lubricant is, for example, a layer-structure compound having a polygonal network bond structure. The layer-structure compound is a compound having a layered structure having an interlayer distance of angstrom order, has cleavability, and has layers that are displaced from each other to thereby exert the lubricating effect inferentially.

Specific examples of the specific lubricant include melamine cyanurate, boron nitride, molybdenum disulfide, graphite fluoride, mica, graphite, talc, tungsten disulfide, cadmium iodide, phthalocyanine, and metal phthalocyanine.

Note that the lubricant solid may contain a single specific lubricant alone or two or more specific lubricants.

Of these, the specific lubricant is, from the viewpoint of being more likely to function as the lubricant and being less likely to deteriorate due to discharging, preferably melamine cyanurate, boron nitride, or molybdenum disulfide, more preferably melamine cyanurate or boron nitride, still more preferably melamine cyanurate.

The content of the specific lubricant relative to the total amount of the lubricant solid is 92 mass % or more and 100 mass % or less and is, from the viewpoint of providing a lubricant that is less likely to deteriorate due to discharging, preferably 95 mass % or more and 100 mass % or less, more preferably 99 mass % or more and 100 mass % or less.

The lubricant solid may contain, in a content of 8 mass % or less relative to the total amount of the lubricant solid, a component other than the specific lubricant.

The component other than the specific lubricant is, for example, a lubricant other than the specific lubricant. The lubricant other than the specific lubricant is, for example, a metallic salt of a fatty acid. In the metallic salt of the fatty acid, the fatty acid may be a saturated fatty acid or an unsaturated fatty acid and may be a fatty acid having 10 or more and 25 or less (preferably 12 or more and 22 or less) carbon atoms. Note that such a number of the carbon atoms of the fatty acid includes the carbon atom of the carboxy group. In the metallic salt of the fatty acid, the metal may be a divalent metal and, for example, magnesium, calcium, aluminum, barium, or zinc. Specific examples of the metallic salt of the fatty acid include zinc stearate and zinc laurate.

When the lubricant solid contains the lubricant other than the specific lubricant, a single lubricant other than the specific lubricant alone may be contained or two or more lubricants other than the specific lubricant may be contained.

The total content of the specific lubricant and the lubricant other than the specific lubricant is, from the viewpoint of exerting lubricity, relative to the total amount of the lubricant solid, preferably 98 mass % or more, more preferably 99 mass % or more, still more preferably 99.5 mass % or more.

Form and Properties of Lubricant Solid

The shape of the lubricant solid is not particularly limited and may be, for example, a rectangular parallelepiped shape, a cylindrical shape, or a cubic shape.

The lubricant solid may have, in the surface, an irregularity conforming to the surface shape of the surface (in contact with the lubricant solid) of the lubricant supply member. For example, when the lubricant supply member has a cylindrical shape and the side surface of the cylindrical shape comes into contact with the lubricant solid, the lubricant solid may have a concave shape conforming to the side surface of the cylindrical shape. When the lubricant solid has, in the surface, an irregularity conforming to the surface shape of the lubricant supply member, the lubricant solid may have improved scraping performance.

The volume of a single lubricant solid is not particularly limited and, for example, may be in the range of 0.01 $cm^3$ or more and 100000 $cm^3$ or less, or may be in the range of 0.1 $cm^3$ or more and 10000 $cm^3$ or less, or may be in the range of 1 $cm^3$ or more and 1600 $cm^3$ or less.

When the lubricant solid is a rectangular parallelepiped, for example, the rectangular parallelepiped may have a length of 10 cm or more and 400 cm or less, a width of 5 mm or more and 20 mm or less, and a thickness of 3 mm or more and 20 mm or less.

The lubricant solid preferably has a Martens hardness at 23° C. (hereafter, also simply referred to as "Martens hardness") of 24 $N/mm^2$ or more and 80 $N/mm^2$ or less, more preferably 30 $N/mm^2$ or more and 60 $N/mm^2$ or less, still more preferably 35 $N/mm^2$ or more and 45 $N/mm^2$ or less.

When the lubricant solid has a Martens hardness within such a range, compared with cases of having a Martens hardness lower than the range, the lubricant solid may have high strength and, during scraping of the lubricant using the lubricant supply member, breakage of the solid may be suppressed. When the lubricant solid has a Martens hardness within such a range, compared with cases of having a Martens hardness higher than the range, improved performance of scraping the lubricant using the lubricant supply member may be provided. When the lubricant solid has both of strength and scraping performance, the lubricant may be further supplied to the surface of the photoreceptor and the effect of suppressing wear of the surface of the photoreceptor may be further provided.

The Martens hardness is measured in the following manner.

Specifically, first, the lubricant solid to be measured is set in a measurement device manufactured by Fischer Instruments K.K. (PICODENTOR HM500). In an environment at 23° C., to the surface of the lubricant solid, a Vickers indenter is used to apply a load that is continuously increased. The maximum load (30 mN) is divided by the surface area of intrusion of the Vickers indenter, to thereby determine the measured value of Martens hardness. In the surface of the lubricant solid, at three points randomly selected, the measurement is performed and the average of the measured values is determined as the Martens hardness of the lubricant solid.

The method of controlling the Martens hardness of the lubricant solid so as to be within such a range may be, for example, when the lubricant solid is a compact of lubricant particles described later, a control method of adjusting compression conditions such as pressure during compacting or a control method of adjusting the number-average primary-particle size of the lubricant particles used.

The lubricant solid may be, from the viewpoint of easiness of control of the Martens hardness, a compact of lubricant particles.

The specific lubricant is often ordinarily distributed in the form of lubricant particles. The specific lubricant is less likely to be melted even under heating and hence it is difficult to heat-melt the distributed particles of the specific lubricant to form a solid. Thus, as the method for producing the lubricant solid containing 92 mass % or more of the specific lubricant, the compacting method may be applied.

The compact of the lubricant particles is obtained by, for example, supplying the lubricant particles into a mold and compressing the lubricant particles.

The pressure during compacting is, from the viewpoint of controlling the Martens hardness so as to be within such a range and providing both of the strength and scraping performance of the lubricant solid, preferably 30 $kgf/cm^2$ or more and 110 $kgf/cm^2$ or less, more preferably 38 $kgf/cm^2$ or more and 80 $kgf/cm^2$ or less, still more preferably 45 $kgf/cm^2$ or more and 55 $kgf/cm^2$ or less. In the case of setting the pressure during compacting so as to be within such a range, even when the lubricant solid does not contain binder resin, both of the strength and scraping performance of the lubricant solid may be provided. Thus, the lubricant solid does not necessarily contain binder resin.

The time for applying the load during compacting is, for example, in the range of 1 second or more and 60 seconds or less, preferably in the range of 2 seconds or more and 30 seconds or less, more preferably in the range of 5 seconds or more and 15 seconds or less.

The compact of the lubricant particles may be a compact of lubricant particles having a number-average primary-particle size of 10 μm or less.

When the lubricant particles have a number-average primary-particle size in the range, compared with cases of having a number-average primary-particle size larger than the range, the lubricant supplied to the surface of the photoreceptor in an intermediate-transfer-system image forming apparatus may provide improved transferability of toner images. The reason for this has not been clarified, but is inferred as follows. In this exemplary embodiment, the lubricant particles constituting the lubricant solid that is a compact of the lubricant particles contain 92 mass % or more of particles of the specific lubricant. The particles of the specific lubricant have a small number-average primary-particle size, so that the particles of the specific lubricant having small particle sizes may be moved to the surface of the intermediate transfer body and may be present between the surface of the intermediate transfer body and a toner image. Thus, the adhesion of the toner image to the intermediate transfer body may be decreased, so that the transferability may be improved and missing color in the image formed on textured paper may be suppressed inferentially.

When the lubricant particles have a number-average primary-particle size within the range, compared with cases of having a number-average primary-particle size larger than the range, the lubricant supplied to the surface of a photoreceptor in an image forming apparatus may further suppress wear of the photoreceptor. The reason for this has not been clarified, but is inferred as follows. The lubricant particles have a small number-average primary-particle size, so that the lubricant particles may be more uniformly distributed over the surface of the photoreceptor to further exert the function of the lubricant inferentially.

From the above-described viewpoint, the lubricant particles preferably have a number-average primary-particle size of 10 μm or less, more preferably 5 μm or less, still more preferably 2 μm or less.

When the lubricant solid contains a plurality of species of lubricant particles, the number-average primary-particle size of the lubricant particles means the number-average primary-particle size of all the plurality of species of the lubricant particles contained in the lubricant solid.

Note that the number-average primary-particle size of the lubricant particles constituting the lubricant solid that is the compact of the lubricant particles is measured by observing the surface of the lubricant solid with a microscope. Specifically, the surface of the lubricant solid is observed with a microscope (manufactured by KEYENCE CORPORATION, trade name: VK-9510) at a magnification of 150×; the equivalent circular diameters of 10 lubricant particles observed are averaged on the basis of the number of the particles to determine the number-average particle size of the lubricant particles.

Application of Lubricant Solid

As described above, the lubricant solid according to this exemplary embodiment may be used such that, for example, in an electrophotographic image forming apparatus, the lubricant is supplied to the surface of the photoreceptor for the purpose of suppressing wear of the surface of the photoreceptor.

The lubricant solid according to this exemplary embodiment is not limited to the above-described purpose and may be used for, in an electrophotographic image forming apparatus, any member to which lubricity is imparted. The lubricant solid according to this exemplary embodiment may be used for, for example, in addition to the surface of the photoreceptor, the outer circumferential surface of the intermediate transfer body (specifically, the surface onto which toner images are transferred) for the purpose of supplying the lubricant. The lubricant solid according to this exemplary embodiment may be used, for example, in the case of using an endless belt as a transfer member, a fixing member, a recording-medium transport member, or the like, for the purpose of supplying the lubricant to the inner circumferential surface of the endless belt to improve rotation stability of the endless belt.

The lubricant solid according to this exemplary embodiment may be used for, instead of the image forming apparatus, an apparatus including a member to which lubricity is imparted in which the lubricant applied to the member undergoes an electric load due to discharging.

Hereinafter, as examples of the applications of the lubricant solid according to this exemplary embodiment, an intermediate-transfer-system image forming apparatus and a process cartridge that use the lubricant solid according to this exemplary embodiment to supply the lubricant to the surface of the photoreceptor will be described.

Image Forming Apparatus

An image forming apparatus according to an exemplary embodiment includes an electrophotographic photoreceptor including a photosensitive layer; a charging unit that charges a surface of the electrophotographic photoreceptor; an electrostatic-image-forming unit that forms, on the charged surface of the electrophotographic photoreceptor, an electrostatic image; a development unit that houses an electrostatic image developer including an electrostatic-image-developing toner, and uses the electrostatic image developer to develop the electrostatic image formed on the surface of the electrophotographic photoreceptor to form a toner image; an intermediate transfer body having a surface to which the toner image is transferred; a first transfer unit that subjects the toner image formed on the surface of the electrophotographic photoreceptor to first transfer onto a surface of the intermediate transfer body; a second transfer unit that subjects the toner image transferred onto the surface of the intermediate transfer body to second transfer onto a surface of a recording medium; a cleaning unit including a cleaning member that is in contact with the surface of the electrophotographic photoreceptor and cleans the surface of the electrophotographic photoreceptor; and a lubricant supply unit that houses a lubricant solid containing, in a content of 92 mass % or more and 100 mass % or less, a lubricant having a polygonal network bond structure and that supplies the lubricant having the polygonal network bond structure to a position where the cleaning member is in contact with the electrophotographic photoreceptor.

In an image forming apparatus in which a toner image formed on the surface of the photoreceptor is transferred onto a recording medium and subsequently a cleaning member in contact with the surface of the photoreceptor is used to clean the surface of the photoreceptor, the photoreceptor is rotated while the cleaning member is in contact with the surface of the photoreceptor. Thus, friction due to the cleaning member may tend to cause wear of the surface of the photoreceptor.

As described above, the method of suppressing wear of the surface of the photoreceptor due to the cleaning member may be, for example, a method of disposing a lubricant supply unit that supplies the lubricant contained in the lubricant solid to a point where the cleaning member is in contact with the photoreceptor. In the image forming apparatus in which the lubricant supply unit is disposed, for example, to the surface of the photoreceptor, the lubricant contained in the lubricant solid is supplied to form a cover film of the lubricant, so that the frictional force due to the cleaning member in contact with the surface of the photoreceptor is reduced and wear of the photoreceptor is suppressed.

On the other hand, when the lubricant contained in the lubricant solid is supplied to the surface of the photoreceptor, in the case where the image forming apparatus employs the intermediate transfer system, transferability of toner images from the intermediate transfer body to recording media may be degraded. Thus, in images formed on recording media having large surface irregularities such as embossed paper (hereafter, also referred to as "textured paper"), missing color resulting from the degradation of transferability may occur. The reason why supply of the lubricant to the surface of the photoreceptor causes missing color resulting from the degradation of transferability has not been clarified, but is inferred as follows.

The lubricant supplied to the surface of the photoreceptor may deteriorate due to, for example, the electric load of discharging from, for example, the charging unit that charges the surface of the photoreceptor. In particular, in zinc stearate, which is ordinarily used as lubricant, the electric load breaks carbon-carbon bonds in the carbon chain to decompose zinc stearate to break the lamella structure, which results in deterioration inferentially. The deteriorated lubricant is moved to the surface of the intermediate transfer body, so that the deteriorated lubricant increases the adhesion between the surface of the intermediate transfer body and toner images, the toner images become less likely to be transferred onto recording media, and missing color resulting from the degradation of transferability occurs inferentially.

By contrast, in this exemplary embodiment, a lubricant supply unit is included so as to house a lubricant solid containing the specific lubricant in a content of 92 mass % or more and 100 mass % or less. Thus, 92 mass % or more of the lubricant supplied to the surface of the photoreceptor is the specific lubricant. As a result, both of suppression of wear of the surface of the photoreceptor and suppression of missing color in images formed on textured paper may be provided. Specifically, compared with cases of not including the lubricant supply unit, wear of the surface of the photoreceptor may be suppressed and, compared with cases of including a lubricant supply unit housing a lubricant solid containing zinc stearate in a content of 8 mass % or more, missing color in images formed on textured paper may be suppressed. The reason why, in the image forming apparatus according to this exemplary embodiment, compared with cases of including a lubricant supply unit housing a lubricant solid containing zinc stearate in a content of 8 mass % or more, missing color in images formed on textured paper may be suppressed has not been clarified, but is inferred as follows.

The specific lubricant has a polygonal network bond structure and hence may be less likely to undergo breaking of bonds even under an electric load due to discharging; even when bonds are partly broken, the network structure may inhibit decomposition and the slidability between layers may be maintained inferentially. The lubricant solid contains 92 mass % or more of the specific lubricant and 8 mass % or less of a component other than the specific lubricant, so that, even when the component other than the specific lubricant is affected by the electric load, lubricity of the lubricant as a whole contained in the lubricant solid may be maintained and deterioration may be suppressed.

Thus, even when the lubricant is moved to the surface of the intermediate transfer body, deterioration of the lubricant moved may be suppressed, so that the increase in the adhesion between the surface of the intermediate transfer body and toner images may be less likely to occur and, in images formed on textured paper, missing color resulting from the degradation of transferability may be suppressed inferentially.

For such reasons, when the lubricant supply unit is included so as to house the lubricant solid containing the specific lubricant in a content of 92 mass % or more and 100 mass % or less, both of suppression of wear of the surface of the photoreceptor and suppression of missing color in images formed on textured paper may be provided inferentially.

Hereinafter, the configuration of the image forming apparatus according to this exemplary embodiment will be described in detail.

As described above, the image forming apparatus according to this exemplary embodiment includes a photoreceptor, a charging unit, an electrostatic-image-forming unit, a development unit, an intermediate transfer body, a first transfer unit, a second transfer unit, a cleaning unit including a cleaning member that is in contact with the surface of the photoreceptor and cleans the surface of the photoreceptor, and a lubricant supply unit that houses a lubricant solid containing, in a content of 92 mass % or more and 100 mass % or less, a lubricant having a polygonal network bond structure and that supplies the lubricant having the polygonal network bond structure to a position where the cleaning member is in contact with the photoreceptor.

The image forming apparatus according to this exemplary embodiment may further include, for example, a discharging unit that, after transfer of an electrostatic-image-developing toner image and before charging, irradiates the surface of the photoreceptor with discharging light to perform discharging.

In the image forming apparatus according to this exemplary embodiment, for example, a part including at least the photoreceptor, the charging unit, the cleaning unit, and the lubricant supply unit may have a cartridge structure attached to and detached from the image forming apparatus (namely, a process cartridge).

Hereinafter, a non-limiting example of the image forming apparatus according to this exemplary embodiment will be described.

FIG. 1 is a schematic configuration view of an example of an image forming apparatus according to this exemplary embodiment.

Referring to FIG. 1, in an image forming apparatus 10 according to this exemplary embodiment, for example, a photoreceptor 12 is disposed. The photoreceptor 12 is provided so as to have a cylindrical shape, for example, and connected to a driving section 27 such as a motor via a driving-force transmission member such as a gear (not shown) so as to be, by the driving section 27, driven to rotate around the rotation shaft represented by the black point. In the example illustrated in FIG. 1, the photoreceptor 12 is driven to rotate in the direction represented by arrow A.

Around the photoreceptor 12, for example, a charging device 15 (an example of the charging unit), an electrostatic-image-forming device 16 (an example of the electrostatic-image-forming unit), a developing device 18 (an example of the development unit), a first transfer device 31 (an example of the first transfer unit), a lubricant supply device 64 (an example of the lubricant supply unit), a cleaning device 22 (an example of the cleaning unit), and a discharging device 24 are sequentially disposed in the rotation direction of the photoreceptor 12.

The first transfer device 31 is disposed inside of an intermediate transfer belt 50 (an example of the intermediate transfer body) so as to be positioned to face the photoreceptor 12. The intermediate transfer belt 50 is disposed so as to be wrapped around a driving roller 42, a support roller 44, and a counter roller 46, which are in contact with the inner surface of the intermediate transfer belt 50, and to run in the direction represented by arrow B. On the image-holding surface of the intermediate transfer belt 50, at a position facing the counter roller 46, a second transfer device 48 (an example of the second transfer unit) is disposed.

In the image forming apparatus 10, a fixing device 26 is also disposed so as to include a fixing member 26A and a press member 26B disposed in contact with the fixing member 26A. The image forming apparatus 10 also includes a control device 36 that controls operations of devices (sections). Note that the unit including the photoreceptor 12, the charging device 15, the electrostatic-image-forming device 16, the developing device 18, the first transfer device 31, the cleaning device 22, and the lubricant supply device 64 corresponds to an image forming unit.

The image forming apparatus 10 may include the photoreceptor 12, the charging device 15, the cleaning device 22, and the lubricant supply device 64 that are combined together as a process cartridge.

Hereinafter, devices (parts) of the image forming apparatus 10 will be described in detail. Note that the reference signs may be omitted.

Photoreceptor

The photoreceptor 12 includes a photosensitive layer.

The photosensitive layer may be a monolayered photosensitive layer containing a charge generation material and a charge transport material in the same photosensitive layer so as to have a combination of the functions, or a multilayered photosensitive layer including a charge generation layer and a charge transport layer individually having functions. When the photosensitive layer is the multilayered photosensitive layer, the order of the charge generation layer and the charge transport layer disposed is not particularly limited; however, the photoreceptor may have a configuration including, on a conductive base body, the charge generation layer, the charge transport layer, and a surface protective layer in this order. The photoreceptor 12 may include, in addition to these layers, another layer. The photosensitive layer may be an organic photosensitive layer or an inorganic photosensitive layer.

Charging Device

The charging device 15 charges the surface of the photoreceptor 12. The charging device 15 includes, for example, a charging member 14 that is disposed in contact with or not in contact with the surface of the photoreceptor 12 and that charges the surface of the photoreceptor 12, and a power source 28 that applies a charging voltage to the charging member 14 (an example of the voltage application section for the charging member). The power source 28 is electrically connected to the charging member 14.

The charging member 14 of the charging device 15 may be, for example, a contact charger using, for example, a conductive charging roller, a charging brush, a charging film, a charging rubber blade, or a charging tube. Alternatively, the charging member 14 may be, for example, a publicly known charger such as a non-contact roller charger or a scorotron charger or a corotron charger using corona discharging.

Electrostatic-Image-Forming Device

The electrostatic-image-forming device 16 forms, on the charged surface of the photoreceptor 12, an electrostatic image. Specifically, for example, the electrostatic-image-forming device 16 irradiates the surface of the photoreceptor 12 charged by the charging member 14, with light L modulated on the basis of image information of the image to be formed, to form, on the photoreceptor 12, an electrostatic image corresponding to the image of the image information.

The electrostatic-image-forming device 16 may be, for example, an optical device having a light source for image-wise exposure using light such as semiconductor laser light, LED light, or liquid crystal shutter light.

Developing Device

The developing device 18 is disposed, for example, in a region downstream, in the rotation direction of the photoreceptor 12, relative to the position of irradiation with light L by the electrostatic-image-forming device 16. Within the developing device 18, a housing section is disposed so as to house an electrostatic image developer. The housing section houses an electrostatic image developer containing an electrostatic-image-developing toner. The electrostatic-image-developing toner may contain, for example, toner particles containing a binder resin and an external additive externally added to the toner particles. The electrostatic image developer may be a mono-component developer composed of the electrostatic-image-developing toner alone or a two-component developer including the electrostatic-image-developing toner and a carrier. The electrostatic image developer may be magnetic or non-magnetic.

The electrostatic-image-developing toner is housed so as to be charged within the developing device 18, for example.

The developing device 18 includes, for example, a developing member 18A that uses a developer containing the electrostatic-image-developing toner to develop the electrostatic image formed on the surface of the photoreceptor 12, and a power source 32 that applies a developing voltage to the developing member 18A. This developing member 18A is, for example, electrically connected to the power source 32.

The developing member 18A of the developing device 18 is selected in accordance with the type of the developer and may be, for example, a development roller including a development sleeve containing a magnet.

The developing device 18 (including the power source 32) is, for example, electrically connected to the control device 36 disposed in the image forming apparatus 10, and is drivingly controlled by the control device 36 to apply the development voltage to the developing member 18A. The developing member 18A to which the development voltage is applied has a development potential in accordance with the development voltage. The developing member 18A having the development potential, for example, holds, on the surface, the developer housed in the developing device 18 and supplies the electrostatic-image-developing toner contained in the developer from within the developing device 18 to the surface of the photoreceptor 12. On the surface of the photoreceptor 12 to which the electrostatic-image-developing toner is supplied, the electrostatic image formed is developed to form an electrostatic-image-developing toner image.

Intermediate Transfer Belt

The intermediate transfer belt 50 is supported by the driving roller 42, the support roller 44, and the counter roller 46 so as to rotate and run in the direction represented by arrow B. Onto the surface of the intermediate transfer belt 50, the first transfer device 31 transfers the electrostatic-image-developing toner image formed on the surface of the photoreceptor 12. Subsequently, the electrostatic-image-developing toner image having been transferred onto the surface of the intermediate transfer belt 50 reaches the position between the second transfer device 48 and the counter roller 46 and is transferred from the surface of the intermediate transfer belt 50 onto the surface of a recording medium P.

The intermediate transfer belt 50 has the shape of a belt containing semi-conductivity-imparted polyimide, polyamide-imide, polycarbonate, polyarylate, polyester, or rubber, for example. Note that, instead of the intermediate transfer belt 50, a drum-shaped intermediate transfer body may be used.

Transfer Device

The first transfer device 31 is disposed, for example, in a region downstream in the rotation direction of the photoreceptor 12 relative to the position where the developing member 18A is disposed. The first transfer device 31 includes, for example, a first transfer member 20 that transfers the electrostatic-image-developing toner image formed on the surface of the photoreceptor 12 onto the intermediate transfer belt 50, and a power source 30 that applies a first transfer voltage to the first transfer member 20. The first transfer member 20 has, for example, a cylindrical shape and transports the intermediate transfer belt 50 disposed between the first transfer member 20 and the photoreceptor 12. The first transfer member 20 is, for example, electrically connected to the power source 30.

The second transfer device 48 includes, for example, a second transfer member 52 that transfers the electrostatic-image-developing toner image having been transferred onto the surface of the intermediate transfer belt 50, onto a recording medium P, and a power source 34 that applies a second transfer voltage to the second transfer member 52. The second transfer member 52 has, for example, a cylindrical shape and transports the recording medium P disposed between the second transfer member 52 and the counter roller 46. The second transfer member 52 is, for example, electrically connected to the power source 34.

The first transfer member 20 and the second transfer member 52 may each be, for example, a contact transfer charger using a belt, a roller, a film, a rubber cleaning blade, or the like or a publicly known non-contact transfer charger such as a scorotron transfer charger or a corotron transfer charger using corona discharge.

The first transfer device 31 (including the power source 30) is, for example, electrically connected to the control device 36 disposed in the image forming apparatus 10, and drivingly controlled by the control device 36 to apply the first transfer voltage to the first transfer member 20. The first transfer member 20 to which the first transfer voltage is applied has a transfer potential in accordance with the first transfer voltage.

When the power source 30 of the first transfer member 20 applies, to the first transfer member 20, a transfer voltage of a polarity opposite to that of the electrostatic-image-developing toner forming the electrostatic-image-developing toner image formed on the photoreceptor 12, for example, in a region where the photoreceptor 12 and the first transfer member 20 face each other (in FIG. 1, refer to a transfer region 32A), a transfer electric field is formed so as to have an electric field strength that moves such electrostatic-image-developing toners forming the electrostatic-image-developing toner image on the photoreceptor 12, by the electrostatic force, from the photoreceptor 12 toward the first transfer member 20.

Similarly, the second transfer device 48 is, for example, electrically connected to the control device 36, and drivingly controlled by the control device 36 to apply the second transfer voltage to the second transfer member 52. Subsequently, when the power source 34 of the second transfer member 52 applies, to the second transfer member 52, a transfer voltage of a polarity opposite to that of the electrostatic-image-developing toner forming the electrostatic-image-developing toner image having been transferred onto the intermediate transfer belt 50, a transfer electric field is formed so as to have an electric field strength that moves such electrostatic-image-developing toners forming the electrostatic-image-developing toner image on the intermediate transfer belt 50, by the electrostatic force, from the intermediate transfer belt 50 toward the second transfer member 52.

The recording medium P is, for example, housed in a housing section (not shown), and is, from the housing section, transported using a plurality of transport members (not shown) along a transport path 54, to reach the region where the counter roller 46 and the second transfer member 52 face each other. In the example illustrated in FIG. 1, the recording medium P is transported in the direction represented by arrow C. On the recording medium P having reached the transfer region, for example, a transfer electric field formed in the region by application of the second transfer voltage by the second transfer member 52 causes transfer of the electrostatic-image-developing toner image on the intermediate transfer belt 50. Specifically, for example, from the surface of the intermediate transfer belt 50 to the recording medium P, the electrostatic-image-developing toner is moved to thereby transfer the electrostatic-image-developing toner image onto the recording medium P.

Note that examples of the recording medium P include plain paper used for electrophotographic copiers, printers, and the like, OHP sheets, coat paper in which the surface of plain paper is coated with resin or the like, art paper for printing, and textured paper such as embossed paper.

Cleaning Device

The cleaning device 22 is disposed in a region downstream in the rotation direction of the photoreceptor 12 relative to the lubricant supply device 64. The cleaning device 22, after the electrostatic-image-developing toner image is transferred onto the intermediate transfer belt 50 and the lubricant is supplied from the lubricant supply device 64 to the surface of the photoreceptor 12, cleans, for example, residual toner adhering to the photoreceptor 12. Specifically, the cleaning device 22 cleans, in addition to residual toner, adhering substances such as the discharge product generated by the charging unit and paper dust.

The cleaning device 22, for example, has a cleaning blade 220 and brings the head of the cleaning blade 220, in a direction opposite to the rotation direction of the photoreceptor 12, into contact with the photoreceptor 12, to remove adhering substances from the surface of the photoreceptor 12. The head of the cleaning blade 220 is oriented in the direction opposite to the rotation direction (direction represented by arrow A) of the photoreceptor 12 and is, in this state, in contact with the surface of the photoreceptor 12.

The cleaning blade 220 is a plate-shaped member having elasticity. The material forming the cleaning blade 220 is, for example, an elastic material such as silicone rubber, fluororubber, ethylene-propylene-diene rubber, or polyurethane rubber, particularly preferably polyurethane rubber having good mechanical properties such as wear resistance, chipping resistance, and creeping resistance.

The cleaning blade 220 is, for example, bonded, at a surface opposite from a surface in contact with the photoreceptor 12, to a support member to thereby be supported by the support member. This support member presses the cleaning blade 220 to the photoreceptor 12 at the pressing pressure. The support member may be formed of a metallic material such as aluminum or stainless steel. Note that an adhesive layer formed of an adhesive or the like may be disposed between the support member and the cleaning blade 220 in order to bond together both of these.

The cleaning device may include, in addition to the cleaning blade 220 and the supporting member for supporting the cleaning blade 220, a publicly known member.

The cleaning device may include, instead of the cleaning blade 220, for example, another cleaning member such as a cleaning brush.

Note that, in this exemplary embodiment, the lubricant supply unit houses the lubricant solid containing the specific lubricant in a content of 92 mass % or more and 100 mass % or less, so that, even when the cleaning device has, as the cleaning member, a cleaning blade, wear of the surface of the photoreceptor may be suppressed.

Lubricant Supply Device

The lubricant supply device 64 is disposed in a region downstream in the rotation direction of the photoreceptor 12 relative to the first transfer device 31, and includes a lubricant solid 66A, a lubricant supply member 66B, and a leveling member 77. The lubricant supply device 64 is disposed in contact with the surface of the photoreceptor 12. The leveling member 77 levels the lubricant supplied to the surface of the photoreceptor 12. The leveling member may also be the above-described example of the cleaning blade 220. The lubricant supply device 64 may include a plate-shaped member (not shown) that mechanically knocks off the electrostatic-image-developing toner adhering to the rotary brush.

The lubricant supply member 66B is disposed, for example, in contact with the lubricant solid 66A and the photoreceptor 12. The lubricant supply member 66B supplies the lubricant to a position where the lubricant supply member 66B is in contact with the photoreceptor 12.

The lubricant supply member 66B may be, for example, a rotary brush or a rubber roller and is, of these, preferably a rotary brush.

When the lubricant supply member 66B is a rotary brush, for example, compared with a case where the lubricant supply member 66B is a rubber roller, the scraping performance for the lubricant solid 66A may be improved and the lubricant may be further supplied to the surface of the photoreceptor, so that the effect of suppressing wear of the surface of the photoreceptor may be further provided.

The lubricant supply device 64 may, for example, bring the lubricant solid 66A into contact with the lubricant supply member 66B to thereby make the lubricant contained in the lubricant solid 66A adhere to the lubricant supply member 66B, and bring the surface (to which the lubricant adheres) of the lubricant supply member 66B into contact with the surface of the photoreceptor 12, to supply the adhering lubricant to the surface of the photoreceptor 12. For example, in a case where the lubricant supply member 66B is a rotary brush, as illustrated in FIG. 1, while the lubricant solid 66A is in contact with the rotary brush serving as the lubricant supply member 66B and the rotary brush is in contact with the photoreceptor 12, the rotary brush is rotated. Thus, the lubricant adheres to the rotary brush and the adhering lubricant is supplied to the surface of the photoreceptor 12. The lubricant supplied to the surface of the photoreceptor 12 forms a film of the lubricant on the surface of the photoreceptor 12.

The brush fibers (hereafter, also referred to as “fibers”) of the rotary brush may be resin fibers such as nylon, acrylic, polypropylene, or polyester.

The rotary brush may have a fiber density, for example, in the range of $15\times10^3$ fibers/inch$^2$ or more and $120\times10^3$ fibers/inch$^2$ or less (in other words, 23.4 fibers/mm$^2$ or more and 186 fibers/mm$^2$ or less), preferably, from the viewpoint of uniform coatability, in the range of $50\times10^3$ fibers/inch$^2$ or more and $120\times10^3$ fibers/inch$^2$ or less (in other words, 78 fibers/mm$^2$ or more and 186 fibers/mm$^2$ or less).

The rotary brush may have a fiber length, for example, in the range of 1.0 mm or more and 7.0 mm or less, preferably, from the viewpoint of contact stability, in the range of 4.0 mm or more and 7.0 mm or less.

The rotary brush preferably has a fiber fineness, from the viewpoint of improving the lubricant-scraping performance, in the range of 0.5 deniers or more and 30 deniers or less, more preferably in the range of 1 denier or more and 30 deniers or less.

When the rotary brush has a fiber fineness in such a range, compared with cases where the fiber fineness is smaller than the range, the scraping force may be increased to thereby improve the lubricant-scraping performance. When the rotary brush has a fiber fineness in such a range, compared with cases where the fiber fineness is larger than the range, the lubricant may be scraped with stability (specifically, chipping of the lubricant solid due to the large fiber fineness becomes less likely to occur) to thereby improve the lubricant-scraping performance. When the lubricant-scraping performance is improved, the lubricant may be further supplied to the surface of the photoreceptor, and the effect of suppressing wear of the surface of the photoreceptor may be further provided.

In the rotary brush, the length of the fibers entering the surface of the photoreceptor 12 is, for example, 0.3 mm or more and 1.5 mm or less.

A ratio Hm/Hf of a Martens hardness Hm at 23° C. of the lubricant solid 66A to a Martens hardness Hf at 23° C. of the fibers of the rotary brush is preferably 1 or less, more preferably 0.8 or less.

When the ratio Hm/Hf is in such a range, compared with cases where the ratio Hm/Hf is higher than the range, the lubricant may be scraped with stability from the lubricant solid. Thus, when the lubricant solid is excessively harder than the fibers of the rotary brush, the lubricant becomes less likely to be scraped.

Note that the Martens hardness Hf of the fibers of the rotary brush is measured in the following manner. Specifically, brush fibers cut to have appropriate lengths are placed on a Si wafer and subjected to a compression test using an ultra micro hardness tester DUH-211 manufactured by SHIMADZU CORPORATION.

The rotation speed of the rotary brush or rubber roller may be changed in accordance with the peripheral velocity of the photoreceptor 12; for example, the relative speed ratio of the rotary brush or rubber roller to the photoreceptor 12 may be 0.5 or more and 1.5 or less. The rotation direction of the rotary brush or rubber roller may be the same direction as or a direction opposite to the rotation direction of the photoreceptor 12.

Discharging Device

The discharging device 24 is disposed, for example, in a region downstream in the rotation direction of the photoreceptor 12 relative to the cleaning device 22. The discharging device 24, after transfer of a toner image, exposes the surface of the photoreceptor 12 to thereby discharge the surface. Specifically, for example, the discharging device 24 is electrically connected to the control device 36 disposed in the image forming apparatus 10 and is drivingly controlled by the control device 36 to expose the whole surface of the photoreceptor 12 (specifically, for example, the whole surface of the image formation region) to discharge the surface.

Examples of the discharging device 24 include devices having a light source such as a tungsten lamp that emits white light or a light-emitting diode (LED) that emits red light.

Fixing Device

The fixing device 26 is disposed, for example, in a region downstream in the transport direction of the transport path 54 of the recording medium P, relative to the second transfer device 48. The fixing device 26 includes a fixing member 26A and a press member 26B disposed in contact with the fixing member 26A, and fixes, in the region where the fixing member 26A and the press member 26B are in contact with each other, the toner image having been transferred onto the recording medium P. Specifically, for example, the fixing device 26 is electrically connected to the control device 36 disposed in the image forming apparatus 10, and is drivingly controlled by the control device 36 to apply heat and pressure to the toner image having been transferred onto the recording medium P to fix the toner image on the recording medium P.

Examples of the fixing device 26 include publicly known fixing devices such as heat-roller fixing devices and oven fixing devices.

Specifically, for example, as the fixing device 26, a well-known fixing device including, as the fixing member 26A, a fixing roller or a fixing belt and, as the press member 26B, a press roller or a press belt is applied.

The recording medium P that has been transported along the transport path 54 and passed through the second transfer device 48 to undergo transfer of the toner image is, for example, further transported by a transport member (not shown) along the transport path 54 to the position where the fixing device 26 is disposed, and the toner image on the recording medium P is fixed.

The recording medium P on which the toner image has been fixed to form an image is exited by a plurality of transport members (not shown) to the outside of the image forming apparatus 10. Note that the photoreceptor 12 having been discharged by the discharging device 24 is again charged, by the charging device 15, to the charging potential.

Operations of Image Forming Apparatus

An example of the operations of the image forming apparatus 10 according to this exemplary embodiment will be described. Note that the operations of the image forming apparatus 10 are performed by control programs executed in the control device 36.

The image forming operation of the image forming apparatus 10 will be described.

First, the surface of the photoreceptor 12 is charged with the charging device 15. The electrostatic-image-forming device 16 exposes the charged surface of the photoreceptor 12 in accordance with image information. As a result, an electrostatic image is formed on the photoreceptor 12 in accordance with the image information. In the developing device 18, the developer containing the electrostatic-image-developing toner is used to develop the electrostatic image formed on the surface of the photoreceptor 12. Thus, on the surface of the photoreceptor 12, an electrostatic-image-developing toner image is formed.

In the first transfer device 31, the electrostatic-image-developing toner image formed on the surface of the photoreceptor 12 is transferred onto the intermediate transfer belt 50. The electrostatic-image-developing toner image having been transferred onto the intermediate transfer belt 50 is transferred by the second transfer device 48 onto the recording medium P. The electrostatic-image-developing toner image having been transferred onto the recording medium P is fixed by the fixing device 26.

On the other hand, to the surface of the photoreceptor 12 from which the electrostatic-image-developing toner image has been transferred, the lubricant contained in the lubricant solid 66A is supplied by the lubricant supply device 64. The surface of the photoreceptor 12 to which the lubricant has been supplied is cleaned by the cleaning blade 220 in the cleaning device 22 and subsequently discharged by the discharging device 24.

Process Cartridge

The process cartridge according to this exemplary embodiment includes an electrophotographic photoreceptor including a photosensitive layer; a charging unit that charges a surface of the electrophotographic photoreceptor; a cleaning unit including a cleaning member that is in contact with the surface of the electrophotographic photoreceptor and cleans the surface of the electrophotographic photoreceptor; and a lubricant supply unit that houses a lubricant solid containing, in a content of 92 mass % or more and 100 mass % or less, a lubricant having a polygonal network bond structure and that supplies the lubricant having the polygonal network bond structure to a position where the cleaning member is in contact with the electrophotographic photoreceptor, wherein the process cartridge is attached to and detached from an intermediate-transfer-system image forming apparatus.

The process cartridge according to this exemplary embodiment is not limited to the above-described configuration, and may have a configuration including the electrophotographic photoreceptor, the charging unit, the cleaning unit, the lubricant supply unit, and, as needed, for example, at least one other unit selected from an electrostatic-image-forming unit, a development unit, an intermediate transfer body, a first transfer unit, and a second transfer unit.

Hereinafter, a non-limiting example of a process cartridge according to this exemplary embodiment will be described. Note that some parts illustrated in the drawing will be described, but description of the other parts will be omitted.

Figure 2:
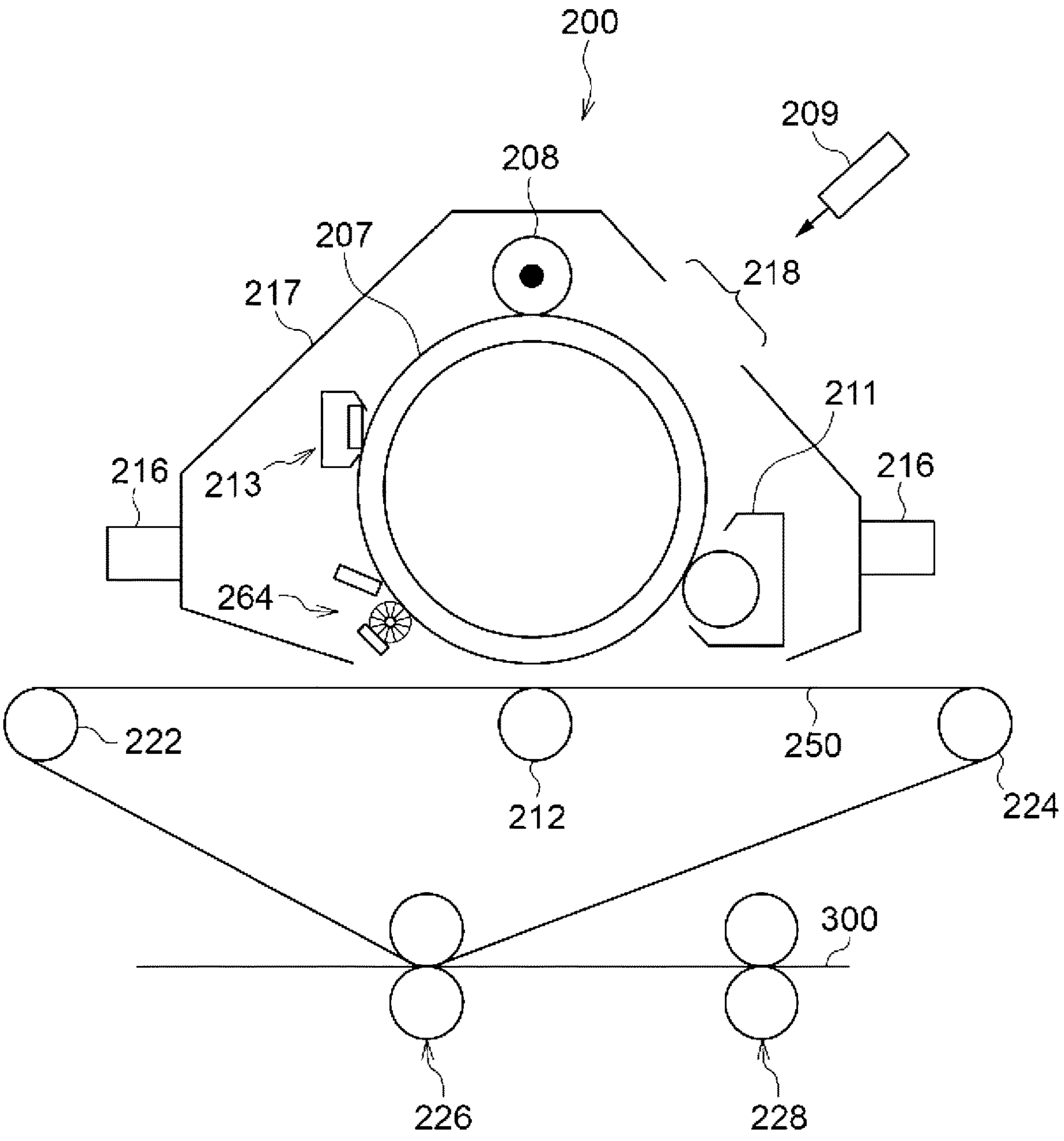
FIG. 2 is a schematic configuration view of an example of a process cartridge according to an exemplary embodiment.

FIG. 2 is a schematic configuration view of the process cartridge according to this exemplary embodiment.

Referring to FIG. 2, in a process cartridge 200, for example, a housing 217 including an attachment rail 216 and an opening 218 for exposure is used to hold the combination of a photoreceptor 207, a charging roller 208 (an example of the charging unit), a developing device 211 (an example of the development unit), a lubricant supply device 264 (an example of the lubricant supply unit), and a photoreceptor cleaning device 213 (an example of the cleaning unit) that are disposed around the photoreceptor 207, to form a cartridge.

FIG. 2 illustrates an exposure device 209 (an example of the electrostatic-image-forming unit), a first transfer roller 212 (an example of the first transfer unit), an intermediate transfer belt 250 (an example of the intermediate transfer body), a driving roller 222 also serving as an intermediate-transfer-belt discharging unit, a support roller 224, a second transfer roller 226 (an example of the second transfer unit), a fixing device 228 (an example of the fixing unit), and a recording paper sheet 300 (an example of the recording medium).

Note that, in FIG. 2, the photoreceptor 207, the charging roller 208, the exposure device 209, the developing device 211, the intermediate transfer belt 250, the first transfer roller 212, the second transfer roller 226, the recording paper sheet 300, the photoreceptor cleaning device 213, the lubricant supply device 264, and the fixing device 228 are respectively similar to, in FIG. 1 above, the photoreceptor 12, the charging device 15, the electrostatic-image-forming device 16, the developing device 18, the intermediate transfer belt 50, the first transfer device 31, the second transfer device 48, the recording medium P, the cleaning device 22, the lubricant supply device 64, and the fixing device 26, and detailed descriptions thereof are omitted.

EXAMPLES

Hereinafter, Examples according to the present disclosure will be described; however, the present disclosure is not limited to the following Examples. Note that, in the following descriptions, "part" and "%" are all based on mass unless otherwise specified.

Example 1

Preparation of Lubricant Solid 1 part by mass of melamine cyanurate particles (manufactured by Nissan Chemical Industries, Ltd., trade name: MC-6000, number-average primary-particle size: <2 μm) are placed into the mold of a compacting apparatus (manufactured by SHIMADZU CORPORATION, trade name: manual hydraulic pump), and compacted in an environment at a temperature of 23° C. and a humidity of 55% RH under conditions of a pressure described in Table 1 and a load application time of 10 seconds, to provide a lubricant solid being a compact.

The obtained lubricant solid has a cylindrical shape having a volume of 883 $mm^3$ (radius: 7.5 mm, thickness: 5 mm).

The obtained lubricant solid is measured in terms of Martens hardness by the above-described method and the result will be described in Table 2. The lubricant particles contained in the obtained lubricant solid are measured by the above-described method in terms of number-average primary-particle size and the result will also be described in Table 2 (in the Table, "Primary-particle size").

For the lubricant solid having the shape of a cylinder having a radius of 7.5 mm and a thickness of 5 mm, peripheral regions of the cylinder are cut off using a knife to form the shape of a rectangular parallelepiped having a length of 10 mm, a width of 10 mm, and a thickness of 5 mm. Such 33 rectangular parallelepipeds are arranged in line so as to have dimensions of a length of 330 mm, a width of 10 mm, and a thickness of 5 mm and used for evaluations below.

Production of Image Forming Apparatus

As an image forming apparatus, a modified version of an image forming apparatus "trade name: Iridesse Production Press (manufactured by FUJIFILM Business Innovation Corp.)" is prepared.

Specifically, as illustrated in FIG. 1, an image forming apparatus is prepared in which the cleaning device 22 includes the cleaning blade 220 being in contact with the surface of the photoreceptor 12 and formed of polyurethane rubber, and the lubricant supply device 64 is included in which the lubricant contained in the lubricant solid 66A is supplied, via the rotary brush serving as the lubricant supply member 66B, to the surface of the photoreceptor 12.

Note that, for the rotary brush, the fibers are nylon, the fiber density is $70\times10^3$ fibers/$inch^2$ (109 fibers/$mm^2$), the fiber length is 5 mm, the fiber fineness is 15 deniers, the ratio Hm/Hf is 0.7, and the length of fibers entering the surface of the photoreceptor is 1 mm.

As the lubricant solid 66A, the obtained lubricant solid is used.

Evaluations

Evaluation of Transferability

In an environment at a temperature of 23° C. and a humidity of 55% RH, the image forming apparatus is used to form a Blue solid image on textured paper (manufactured by Tokushu Tokai Paper Co., Ltd., trade name: LEATHAC 66, 204 GSM) and the image formed on recessed regions of textured paper is visually evaluated in terms of missing color. The evaluation grades are described below and the result will be described in Table 2 (in the Table, "Emboss transferability").

Evaluation Grades

A: missing color and variations in the color do not occur
B: slight variations in the color occur
C: noticeable variations in the color do not occur, but variations in the color occur, compared with Grade B
D: noticeable variations in the color occur
E: missing color occurs Evaluation of Wear of Photoreceptor After the evaluation of transferability, 500,000 sheets of a chart having an area coverage of 7.5% are formed, and the film thickness difference of the photoreceptor before and after the printing is measured using an eddy-current coating thickness measuring system (FISCHERSCOPE MMS) to perform evaluation of wear of the photoreceptor. The result will be described in Table 2 (in Table 2, "Wear of photoreceptor (μm)".

Evaluation of Property of Lubricant Solid

Evaluation of Strength

The obtained lubricant solid is evaluated in terms of strength in the following manner.

Specifically, in an environment at a temperature of 23° C. and a humidity of 55% RH, a HEIDON friction tester is used to study the state of the lubricant solid subjected to a rubbing stress under conditions of an indenter of 0.2 mm sapphire, a load of 50 g, a movement distance of 5 mm, a moving speed of 10 mm/sec, and back and forth rubbing of 10 cycles. The evaluation grades are described below and the result will be described in Table 2.

Evaluation Grades

A: chipping and cracking do not occur
B: chipping occurs, but cracking does not occur
C: chipping occurs and cracking occurs

Example 2

Preparation and measurement of a lubricant solid and production and evaluation of an image forming apparatus are performed as in Example 1 except that, in the preparation of the lubricant solid, instead of 1 part by mass of the melamine cyanurate particles, 1 part by mass of boron nitride particles (manufactured by Denka Company Limited, trade name: spherical nano-size BN, number-average primary-particle size: 0.5 μm) are used.

Example 3

Preparation and measurement of a lubricant solid and production and evaluation of an image forming apparatus are performed as in Example 1 except that, in the preparation of the lubricant solid, instead of 1 part by mass of the melamine cyanurate particles, 0.92 parts by mass of the melamine cyanurate particles (manufactured by Nissan Chemical Industries, Ltd., trade name: MC-6000, number-average primary-particle size: <2 μm) and 0.08 parts by mass of zinc stearate particles (manufactured by FUJIFILM Wako Pure Chemical Corporation, trade name: Zinc Stearate, 1.5 μm, number-average primary-particle size: 1.5 μm) are used.

Examples 4 to 7

Preparation and measurement of a lubricant solid and production and evaluation of an image forming apparatus are performed as in Example 1 except that, in the preparation of the lubricant solid, the pressure during compacting is changed as described in Table 1.

Example 8

Preparation and measurement of a lubricant solid and production and evaluation of an image forming apparatus are performed as in Example 1 except that, in the preparation of the lubricant solid, instead of 1 part by mass of the melamine cyanurate particles (manufactured by Nissan Chemical Industries, Ltd., trade name: MC-6000, number-average primary-particle size: <2 μm), 1 part by mass of melamine cyanurate particles (manufactured by Nissan Chemical Industries, Ltd., trade name: MC-4000, number-average primary-particle size: <14 μm) are used.

Comparative Example 1

Preparation and measurement of a lubricant solid and production and evaluation of an image forming apparatus are performed as in Example 1 except that, in the preparation of the lubricant solid, instead of 1 part by mass of the melamine cyanurate particles, 1 part by mass of zinc stearate particles (manufactured by FUJIFILM Wako Pure Chemical Corporation, trade name: Zinc Stearate, 1.5 μm, number-average primary-particle size: 1.5 μm) are used.

Comparative Example 2

Preparation and measurement of a lubricant solid and production and evaluation of an image forming apparatus are performed as in Example 1 except that, in the preparation of the lubricant solid, instead of 1 part by mass of the melamine cyanurate particles (manufactured by Nissan Chemical Industries, Ltd., trade name: MC-6000, number-average primary-particle size: <2 μm), 0.9 parts by mass of the melamine cyanurate particles (manufactured by Nissan Chemical Industries, Ltd., trade name: MC-6000, number-average primary-particle size: <2 μm) and 0.1 parts by mass of zinc stearate particles (manufactured by FUJIFILM Wako Pure Chemical Corporation, trade name: Zinc Stearate, 1.5 μm, number-average primary-particle size: 1.5 μm) are used.

Comparative Example 3

Production and evaluation of an image forming apparatus are performed as in Example 1 except that, in the production of the image forming apparatus, lubricant solids are not used.

TABLE 1

| | Specific lubricant | | Other lubricant | | |
|---|---|---|---|---|---|
| | Type | Amount of addition (parts by mass) | Type | Amount of addition (parts by mass) | Pressure (kgf/cm$^2$) |
| Example 1 | MC | 1 | — | — | 50 |
| Example 2 | Boron nitride | 1 | — | — | 50 |
| Example 3 | MC | 0.92 | ZnSt | 0.08 | 50 |
| Example 4 | MC | 1 | — | — | 35 |
| Example 5 | MC | 1 | — | — | 150 |
| Example 6 | MC | 1 | — | — | 30 |
| Example 7 | MC | 1 | — | — | 170 |
| Example 8 | MC | 1 | — | — | 50 |
| Comparative Example 1 | — | — | ZnSt | 1 | 50 |
| Comparative Example 2 | MC | 0.9 | ZnSt | 0.1 | 50 |

In the table, "MC" means melamine cyanurate and "ZnSt" means zinc stearate.

TABLE 2

| | Martens hardness (N/mm$^2$) | Primary-particle size (μm) | Evaluations: Emboss transfer-ability | Evaluations: Wear of photoreceptor (μm) | Property of lubricant solid Strength |
|---|---|---|---|---|---|
| Example 1 | 40 | 2 | A | 0.4 | A |
| Example 2 | 39 | 0.5 | A | 0.42 | A |
| Example 3 | 38 | 2 | B | 0.73 | A |
| Example 4 | 28 | 2 | A | 0.45 | A |
| Example 5 | 80 | 2 | B | 0.7 | A |
| Example 6 | 24 | 2 | A | 0.88 | B |
| Example 7 | 82 | 2 | B | 0.92 | A |
| Example 8 | 40 | 14 | B | 0.6 | A |
| Comparative Example 1 | 48 | 1.5 | E | 0.42 | A |
| Comparative Example 2 | 50 | 2 | D | 0.4 | A |
| Comparative Example 3 | — | — | A | 5.3 | — |

As described in Table 2, from the lubricant solids of Examples, compared with the lubricant solids of Comparative Examples, lubricants that are less likely to deteriorate are supplied, so that degradation of the transferability of toner images from the intermediate transfer belt to embossed paper is suppressed.

As described in Table 2, the image forming apparatuses of Examples achieve, compared with the image forming apparatuses of Comparative Examples, both of suppression of wear of the surface of the photoreceptor and suppression of missing color in an image due to degradation of transferability to embossed paper.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A lubricant solid comprising, in a content of 92 mass % or more and 100 mass % or less, a lubricant having a polygonal network bond structure,
wherein the lubricant solid has a Martens hardness at 23° C. of 24 N/mm$^2$ or more and 80 N/mm$^2$ or less.

2. The lubricant solid according to claim 1, wherein the lubricant having the polygonal network bond structure includes melamine cyanurate.

3. The lubricant solid according to claim 2, wherein the lubricant solid is a compact of lubricant particles having a number-average primary-particle size of 10 μm or less.

4. The lubricant solid according to claim 3, wherein the lubricant solid has a Martens hardness at 23° C. of 30 N/mm$^2$ or more and 60 N/mm$^2$ or less.

5. The lubricant solid according to claim 2, wherein the lubricant solid has a Martens hardness at 23° C. of 30 N/mm$^2$ or more and 60 N/mm$^2$ or less.

6. The lubricant solid according to claim 1, wherein the lubricant solid has a Martens hardness at 23° C. of 30 N/mm$^2$ or more and 60 N/mm$^2$ or less.

7. The lubricant solid according to claim 1, wherein the content of the lubricant having the polygonal network bond structure 95 mass % or more and 100 mass % or less.

8. The lubricant solid according to claim 1, further comprising a lubricant other than the lubricant having the polygonal network bond structure.

9. The lubricant solid according to claim 8, wherein the lubricant other than the lubricant having the polygonal network bond structure is a metallic salt of a fatty acid, wherein the fatty acid is a saturated fatty acid or an unsaturated fatty acid and has 10 or more and 25 or less carbon atoms.

10. The lubricant solid according to claim 9, wherein a total content of the lubricant having the polygonal network bond structure and the lubricant other than the lubricant having the polygonal network bond structure is 98 mass % or more.

11. An image forming apparatus comprising:
an electrophotographic photoreceptor including a photosensitive layer;
a charging unit that charges a surface of the electrophotographic photoreceptor;
an electrostatic-image-forming unit that forms, on the charged surface of the electrophotographic photoreceptor, an electrostatic image;
a development unit that houses an electrostatic image developer including an electrostatic-image-developing toner, and uses the electrostatic image developer to develop the electrostatic image formed on the surface of the electrophotographic photoreceptor to form a toner image;
an intermediate transfer body having a surface to which the toner image is transferred;
a first transfer unit that subjects the toner image formed on the surface of the electrophotographic photoreceptor to first transfer onto the surface of the intermediate transfer body;
a second transfer unit that subjects the toner image transferred onto the surface of the intermediate transfer body to second transfer onto a surface of a recording medium;
a cleaning unit including a cleaning member that is in contact with the surface of the electrophotographic photoreceptor and cleans the surface of the electrophotographic photoreceptor; and
a lubricant supply unit that houses a lubricant solid containing, in a content of 92 mass % or more and 100 mass % or less, a lubricant having a polygonal network bond structure and that supplies the lubricant having the polygonal network bond structure to a position where the cleaning member is in contact with the electrophotographic photoreceptor,
wherein the lubricant solid has a Martens hardness at 23° C. of 24 N/mm$^2$ or more and 80 N/mm$^2$ or less.

12. The image forming apparatus according to claim 11, wherein the cleaning member is a cleaning blade.

13. The image forming apparatus according to claim 11, wherein the lubricant supply unit includes a lubricant supply member that is in contact with the surface of the electrophotographic photoreceptor and that supplies, to the position where the cleaning member is in contact with the electrophotographic photoreceptor, the lubricant having the polygonal network bond structure.

14. The image forming apparatus according to claim 13, wherein the lubricant supply member is a rotary brush.

15. The image forming apparatus according to claim 14, wherein the rotary brush includes brush fibers having a fiber fineness of 0.5 deniers or more and 30 deniers or less.

16. The image forming apparatus according to claim 11, wherein the lubricant having the polygonal network bond structure includes melamine cyanurate.

17. The image forming apparatus according to claim 16, wherein the lubricant solid is a compact of particles of the melamine cyanurate having a number-average primary-particle size of 10 μm or less.

18. The image forming apparatus according to claim 11, wherein the lubricant solid has a Martens hardness at 23° C. of 30 N/mm$^2$ or more and 60 N/mm$^2$ or less.

19. The image forming apparatus according to claim 11, further comprising a lubricant other than the lubricant having the polygonal network bond structure,
wherein the lubricant other than the lubricant having the polygonal network bond structure is a metallic salt of a fatty acid, and the fatty acid is a saturated fatty acid or an unsaturated fatty acid and has 10 or more and 25 or less carbon atoms.

20. A process cartridge comprising:
an electrophotographic photoreceptor including a photosensitive layer;
a charging unit that charges a surface of the electrophotographic photoreceptor;
a cleaning unit including a cleaning member that is in contact with the surface of the electrophotographic photoreceptor and cleans the surface of the electrophotographic photoreceptor; and
a lubricant supply unit that houses a lubricant solid containing, in a content of 92 mass % or more and 100 mass % or less, a lubricant having a polygonal network bond structure and that supplies the lubricant having the polygonal network bond structure to a position where the cleaning member is in contact with the electrophotographic photoreceptor, wherein the process cartridge is attached to and detached from an intermediate-transfer-system image forming apparatus, the lubricant solid has a Martens hardness at 23° C. of 24 $N/mm^2$ or more and 80 $N/mm^2$ or less.

* * * * *